US005995355A

United States Patent [19]

Daeumer

[11] Patent Number: 5,995,355

[45] Date of Patent: Nov. 30, 1999

[54] GAS-FILLED DISCHARGE PATH IN A FORM OF A SPARK GAP OR AN OVERVOLTAGE DIVERTER

[75] Inventor: Wolfgang Daeumer, Berlin, Germany

[73] Assignee: Siemens AG, Munich, Germany

[21] Appl. No.: 09/101,603

[22] PCT Filed: Jan. 8, 1997

[86] PCT No.: PCT/DE97/00055

§ 371 Date: Jul. 10, 1998

§ 102(e) Date: Jul. 10, 1998

[87] PCT Pub. No.: WO97/25760

PCT Pub. Date: Jul. 17, 1997

[30] Foreign Application Priority Data

Jan. 12, 1996 [DE] Germany ........................... 196 01 928

[51] Int. Cl.[6] ........................................ H02H 1/00

[52] U.S. Cl. .......................... 361/120; 361/111; 361/115; 361/118; 361/123

[58] Field of Search ................................ 361/56, 91, 111, 361/120, 115, 127, 123

[56] References Cited

U.S. PATENT DOCUMENTS

| | | | |
|---|---|---|---|
| 3,942,161 | 3/1976 | Byrum, Jr. et al. | 340/173 PL |
| 4,493,004 | 1/1985 | Lange et al. | 361/120 |

*Primary Examiner*—Stephen W Jackson
*Attorney, Agent, or Firm*—Kenyon & Kenyon

[57] ABSTRACT

In order to optimize the so-called light-dark effect, i.e., the difference in ignition voltage between the first and second ignition after dark storage in gas-filled discharge paths, an additional component made of an oxide compound of cesium and a transition metal such as tungsten, chromium, niobium, vanadium or molybdenum is added in a quantity of 5 to 25% by weight to the activating compound which is comprised of several components. The other components of the activating compound include a barium compound and a transition metal in metallic form such as titanium, and an alkaline halide or an alkaline earth halide and/or sodium silicate and/or potassium silicate as a basic component.

9 Claims, 1 Drawing Sheet

GAS-FILLED DISCHARGE PATH IN A FORM OF A SPARK GAP OR AN OVERVOLTAGE DIVERTER

FIELD OF THE INVENTION

The invention is in the field of electronic components and is the construction of gas-filled discharge paths having at least two electrodes in which an electrode activation compound having several components is applied to at least one of the electrodes in order to ensure their ignition properties.

BACKGROUND INFORMATION

In order to ensure the particularly desired performance characteristic such as igniting voltage, response time, static response voltage and dynamic response voltage, extinction voltage and glow operating voltage in discharge paths such as ignition gaps or overvoltage diverters filled with inert gas, various measures such as the structural design of the electrodes, the type and pressure of the gas filling and the selection of the activation compound applied to the active surfaces of the electrodes must be adjusted to one another. To produce definitive ignition conditions, it is also customary in this connection to arrange one or several ignition strips on the inside wall of the glass or ceramic insulator and a special ionization source may be provided, if necessary. Thus, for instance, a conventional overvoltage diverter has two electrodes inserted into the front ends of a ceramic insulator, the electrode surfaces facing each other being coated with an activation compound, the latter being arranged in depressions in the electrode surface. Several ignition strips extending in the axial direction of the ceramic insulator are arranged on the inside wall, the ignition strips being designed as middle ignition strips without a direct connection to the electrodes (see U.S. Pat. No. 4,266,260 corresponding to German Patent No. 28 28 650 C2). It is more customary to apply an additional ionization source in the form of a punctiform deposit of a radioactive material on the inside wall of the insulator in gas-filled overvoltage diverters which are located in a space sealed off against the ionization source in the form of a punctiform deposit of a radioactive material on the inside wall of the insulator in gas-filled overvoltage diverters which are located in a space sealed off against the effect of external light during their operation. Alternatively, the gas filling of the overvoltage diverter may include a radioactive gas (see U.S. Pat. No. 3,755,715). In order to ensure a very low ignition delay in gas-filled overvoltage diverters in the dark space, the use of an electroluminescent material as an additional ionization source is also known, the electroluminescent material being applied to the inside wall of the insulator as a coating connecting the two electrodes of the diverter (see German Patent No. 43 18 944 C2).

SUMMARY OF THE INVENTION

An object of the present invention is to provide a gas-filled discharge path (such as a spark gap or an overvoltage diverter) with at least two electrodes so that the gas-filled discharge path has a very low ignition delay in the dark space even without the use of an additional ionization source.

In order to attain this objective, according to the invention an electrode activation compound made up of several components is applied to at least one of the electrodes of the diverter, the electrode activation compound containing in addition to the customary basic components in the form of one or several alkaline halides or alkaline earth halides and/or sodium silicate and/or potassium silicate in an amount of 30–60% by weight, as further components a barium compound and a so-called transition metal in metallic form such as titanium, hafnium, zirconium, vanadium, niobium or chromium in a quantity of 5 to 25% by weight each and an oxide compound of cesium and a so-called transition metal such as tungsten, chromium, molybdenum, niobium or vanadium, i.e., cesium wolframate ($Cs_2WO_4$), cesium chromate ($Cs_2Cr_2O_7$), cesium molybdate ($Cs_2MoO_4$), cesium niobate ($CsNbO_3$) or cesium vanadate ($Cs_2VO_3$) also in an amount of approximately 5 to 25% by weight.

When an activation compound composed according to the present invention is used, it has been shown that the ignition voltage of the first ignition after the discharge path has been stored for 24 hours in darkness is within the range required by the users of discharge paths of this type, particularly not deviating more than 10 to 15% from the ignition voltage value of the second ignition. Beyond that, the use of cesium wolframate or one of the other cesium compounds provided in connection with the present invention as additional components of an activation compound ensures very good extinction characteristics of the discharge path and stable electrical properties even after extended storage in darkness and after having been supplied with electric power. In particular, these electrical properties are the nominal discharge current, the nominal discharge alternating current and the service life load.

A benefit obtained using the present invention is made evident by the fact that a barium compound, preferably a barium-aluminum alloy ($BaAl_4$), and a transition metal in metallic form such as titanium, hafnium, zirconium, vanadium, niobium or chromium are among the components of the electrode activation compound. In this connection, the use of barium-aluminum and metallic titanium as components of an activation compound is described in German Patent No. 26 19 866 as is the use of the basic component in the form of one or several alkaline halides or alkaline earth halides and/or sodium silicate and/or potassium silicate (see German Patent Nos. 26 19 866 C2, 37 23 571 C2, 27 35 865 C2). Furthermore, the use of an oxide compound of cesium and a transition metal such as zirconium, tungsten, tantalum and molybdenum as emission materials for discharge lamps in order to make a low breakdown voltage and operating voltage possible during the total service life of the lamp is known. In this connection the oxide compound is dispersed in the pores of a sintered compact made of high-melting metal. Barium aluminate or barium wolframate may be used as additional emission material (see German Patent No. 30 08 518 C2).

DETAILED DESCRIPTION OF THE INVENTION

Figure 1:
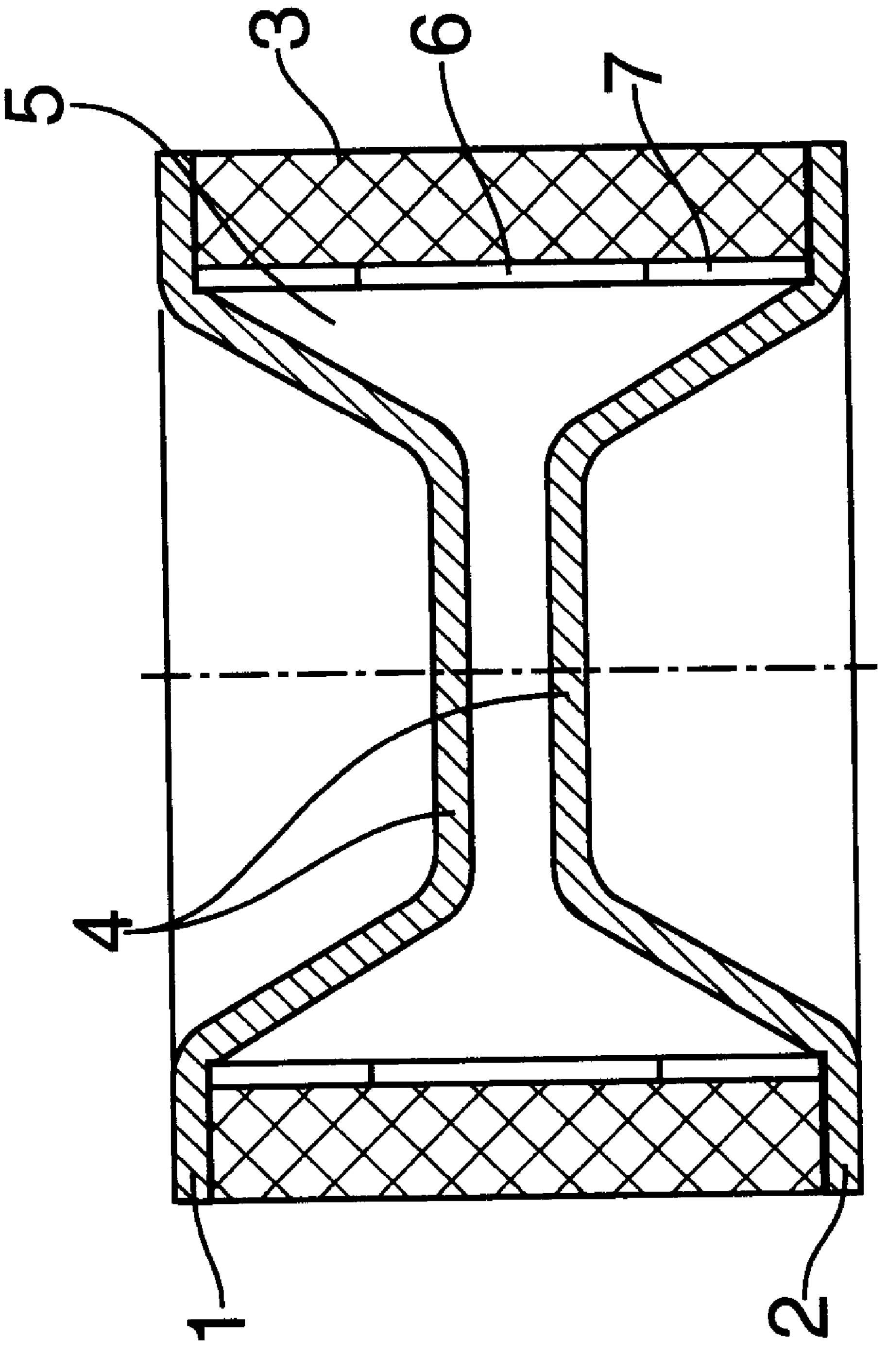
FIG. 1 shows a gas-filled overvoltage diverter according to FIG. 1 of German Patent No. 43 18 994 C2.

In a gas-filled overvoltage diverter, which according to FIG. 1 of German Patent No. 43 18 994 C2 is made up of a ceramic insulator 3 and two electrodes (12) inserted into the front end, an activation compound 4 has been incorporated into the waffled surface of the electrodes, the activation compound containing as a basic component potassium chloride in an amount of 50% by weight, metallic titanium in an amount of 17% by weight, a barium-aluminum compound also in an amount of 17%. by weight and cesium wolframate in an amount of 16% by weight. Furthermore the activation compound may contain smaller proportions of oxides of cesium and the transition metals used, i.e., cesium oxide, titanium oxide and tungsten oxide.

What is claimed is:

1. A gas-filled discharge arrangement, comprising:

at least two electrodes; and an electrode activation compound having a plurality of components applied to at least one of the at least two electrodes, the electrode activation compound including, a base component, at least one of an alkaline halide, an alkaline earth halide, a sodium silicate, and a potassium silicate, in a first amount of approximately 30% to 60% by weight, the electrode activation compound further including a barium compound and a first transition metal in a second amount of 5% to 25% by weight, the first transition metal being in metallic form, and the electrode activation compound further including an oxide compound, the oxide compound including cesium and a second transition metal in a third amount of approximately 5% to 25% by weight.

2. The gas-filled discharge arrangement according to claim 1, wherein the gas-filled discharge arrangement includes one of a spark gap and an overvoltage diverter.

3. The gas-filled discharge arrangement according to claim 1, wherein the first transition metal includes one of titanium, hafnium, zirconium, vanadium, niobium and chromium.

4. The gas-filled discharge arrangement according to claim 1, wherein the second transition metal includes one of tungsten, chromium, molybdenum, niobium and vanadium.

5. The gas-filled discharge arrangement according to claim 1, wherein the oxide compound includes one of cesium wolframate ($Cs_2WO_4$), cesium chromate, cesium molybdate ($Cs_2MoO_4$), cesium niobate and cesium vanadate ($CS_2VO_3$).

6. The gas-filled discharge arrangement according to claim 5, wherein the cesium chromate includes one of $Cs_2Cr_2O_7$, and $Cs_2CrO_4$.

7. A gas-filled discharge arrangement, comprising:

an overvoltage diverter, including:

at least two electrodes; and an electrode activation compound having a plurality of components applied to at least one of the at least two electrodes, the electrode activation compound including, a base component, at least one of an alkaline halide, an alkaline earth halide, a sodium silicate, and a potassium silicate, in a first amount of approximately 30% to 60% by weight, the electrode activation compound further including a barium compound and a first transition metal in a second amount of 5% to 25% by weight, the first transition metal being in metallic form, and the electrode activation compound further including an oxide compound, the oxide compound including cesium and a second transition metal in a third amount of approximately 5% to 25% by weight.

8. The gas-filled discharge arrangement according to claim 7, wherein the oxide compound includes one of cesium wolframate ($Cs_2WO_4$), cesium chromate, cesium molybdate ($Cs_2MoO_4$), cesium niobate and cesium vanadate ($Cs_2VO_3$).

9. The gas-filled discharge arrangement according to claim 8, wherein the cesium chromate includes one of $Cs_2Cr_2O_7$, and $Cs_2CrO_4$.

* * * * *